United States Patent [19]

Kim et al.

[11] Patent Number: 5,210,115
[45] Date of Patent: May 11, 1993

[54] ALLYL MAGNESIUM HALIDE MODIFIED EPOXY RESIN COMPOSITION

[75] Inventors: Whan G. Kim, Seoul; Tai Y. Nam, Kyungki, both of Rep. of Korea

[73] Assignee: Cheil Industries, Inc., Taegu, Rep. of Korea

[21] Appl. No.: 803,042

[22] Filed: Dec. 6, 1991

[30] Foreign Application Priority Data

Feb. 28, 1991 [KR] Rep. of Korea ............... 91-3287
Feb. 28, 1991 [KR] Rep. of Korea ............... 91-3288

[51] Int. Cl.$^5$ .................. C08F 283/00; C08G 8/30
[52] U.S. Cl. ........................ 523/443; 523/466; 525/476; 525/481; 525/482; 525/502; 528/98; 528/101
[58] Field of Search ......... 525/502, 476, 481, 482; 528/101, 98; 523/443, 466

[56] References Cited

U.S. PATENT DOCUMENTS

| | | | |
|---|---|---|---|
| 4,384,129 | 5/1983 | Zahir et al. | 528/101 |
| 4,876,324 | 10/1989 | Nakano et al. | 528/142 |

FOREIGN PATENT DOCUMENTS

| | | |
|---|---|---|
| 54-142298 | 11/1979 | Japan . |
| 58-089619 | 5/1983 | Japan . |
| 58-215452 | 12/1983 | Japan . |
| 59-64660 | 4/1984 | Japan . |
| 59-227918 | 12/1984 | Japan . |
| 59-227924 | 12/1984 | Japan . |
| 62-53324 | 3/1987 | Japan . |
| 62-227917 | 10/1987 | Japan . |
| 62-268132 | 11/1987 | Japan . |
| 62-270618 | 11/1987 | Japan . |
| 63-230728 | 9/1988 | Japan . |

*Primary Examiner*—John C. Bleutge
*Assistant Examiner*—Frederick Krass
*Attorney, Agent, or Firm*—Leydig, Voit & Mayer

[57] ABSTRACT

A modified epoxy resin of the general formula (I) is prepared by dissolving an epoxy resin in a solvent, adding the mixture to allyl magnesium halide at −70° C. under a nitrogen atmosphere, and removing the solvent and salts from the resultant product. The modified epoxy resin is useful for epoxy maleimide resin compositions as a heat resistance enhancer. An epoxy resin composition for sealing semiconductor elements comprising the modified epoxy resin as a heat resistance enhancer is an amount of from 0.1 to 30% by weight, based on the total weight of the composition, is also provided.

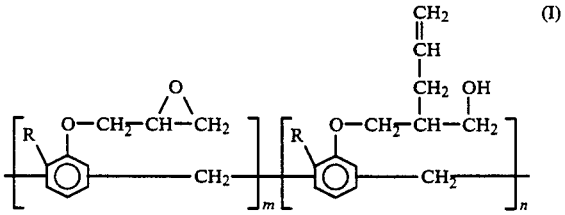

wherein, R represents H or $C_1$ to $C_{10}$-alkyl group and m represents an integer of 0 to 100 and n represents an integer of 1 to 100.

15 Claims, No Drawings

ALLYL MAGNESIUM HALIDE MODIFIED EPOXY RESIN COMPOSITION

FIELD OF INVENTION

The present invention relates to a modified epoxy resin. More particularly, the present invention relates to epoxy resin compositions containing an allyl-modified epoxy resin, which homogeneously disperses maleimide into resin compositions and increases the bonding force with the epoxy resin, and to epoxy resin compositions for sealing semiconductor elements comprising the modified epoxy resin.

BACKGROUND OF THE INVENTION

Cured products comprising epoxy resins and additional additives are widely used in the industrial field, since they exhibit excellent thermal, mechanical, electric and adhesive properties. Blended molding materials of epoxy resins and fillers are widely used as adhesives, insulating materials or structure materials for electronic or electric equipment, and have important roles satisfying the desires for making the equipment compact, improving the reliability and increasing the productivity.

During the past few years the development in packaging materials for protecting semiconductor elements from outer moisture and impact has undergone an enormous advance, due to the continuous growth of the semiconductor industry.

The packaging mode is classified into two types, wherein one using ceramics or metal and another using epoxy resins or silicone resins. However, plastic packaging mode using epoxy resins is a main type, in view of the productivity and cost.

Recently, due to the high integration of semiconductors, the size of a chip has become larger and the width of a wire has become narrow. Accordingly, it is required to increase heat resistant and moisture resistant properties so as to improve reflow properties and to decrease thermal stress generated during the use of the article. According to surface mounting technology, unlike the conventional Due In Line Package (DIP), the package should endure the soldering process conducted at a high temperature of above 215° C., and thus, it is highly required for heat resistance.

In order to satisfy the above mentioned problems, Japanese Laid-Open Publication Nos. (Sho) 54-142298; 62-53324 and 62-270618 attempted to improve thermal properties of resin compositions by curing epoxy resins with reaction initiators having functional groups such as —COOH, —OH, —NH$_2$ and the like at the terminal portion of the imide backbone. However, such attempts have limits in increasing the amount of imide which contributes to the improvement of heat resistance. Japanese Patent Laid Open Publication Nos. (Sho) 58-215452; 58-89619; 59-64660; 59-227924 and 62-227917 disclose a method for reacting an amino group with an epoxy groups in resin compositions, by initially reacting compounds having an amino groups at the terminal position, for example, p- or m-aminophenol and diaminodiphenylmethane to give a prepolymer, and then adding it into resin compositions. However, this method has difficulties in controlling the degree of reaction and also has a limit in increasing the imide content.

A method for increasing the heat resistance of a cured product by blending epoxy resins and amine compounds with polyfunctional polymaleimide to improve the curing property is also known. This method has storage stability at room temperature (20° C. to 30° C.) and difficulty in providing a homogeneous curing reaction problems.

Japanese Laid-Open Patent Publication Nos. (Sho) 59-227918 and 62-268132 disclose modified curing agents, which are curing agents for epoxy resins and capable of reacting with both epoxy and maleimide by incorporating an allyl group into a phenol-novolak resin. Japanese Laid-open Patent Publication No. (Sho) 63-230728 discloses curing agents having both hydroxy groups and allyl groups in the epoxy resins. However, such curing agents are prepared by incorporating an allyl group into phenol resins and then reacting with epoxy resins, which have a complex preparation and disadvantage in costs.

We have extensively studied this technology to solve the above mentioned problems. As a result, we noted that the use of modified epoxy resins to which allyl groups are incorporated in preparing heat resistance epoxy resin/maleimide resin compositions as a medium and compatibilizer contributes to the improvement in bonding force and compatibility between epoxy resins and maleimide resins, which provides a homogeneous dispersing and curing effects. We further noted that epoxy resin compositions for sealing semiconductor elements comprising the modified epoxy resins exhibit excellent heat resistance and moldability.

SUMMARY OF THE INVENTION

Therefore, the object of the present invention is to provide a modified epoxy resin useful for improving bonding force and compatibility between epoxy resins and maleimide resins, and heat resistant resin compositions comprising the modified epoxy resin.

Another object of the present invention is to provide resin compositions having excellent heat resistance and moldability in which an allyl-modified epoxy resin is used to improve heat resistance and compatibility of epoxy resin/maleimide resin composition and which is useful for sealing semiconductor elements.

The present invention pertains to a modified epoxy resin of the general formula (I), which is added to epoxy resin/maleimide resin compositions so as to improve curing properties and compatibility.

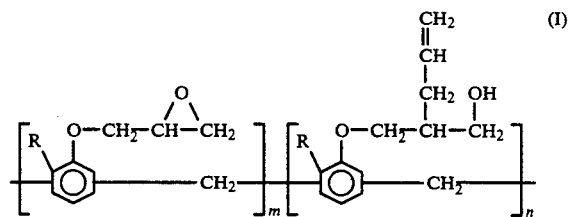

wherein,

R represents H or $C_1$–$C_{10}$-alkyl group, and m and n represent independently an integer of 0 or 1 to 100.

The present invention also relates to heat resistant resin compositions comprising epoxy resins, maleimide resins, curing agents, curing promoters and 10 to 50% by weight of an allyl-modified epoxy resin of formula (I.).

The present invention is directed to epoxy resin compositions for sealing semiconductor elements comprising epoxy resins, curing agents, curing promoters, stress lowering agents and 0.1 to 30% by weight of an allyl-modified epoxy resin of formula (I) as a heat resistance enhancer.

DETAILED DESCRIPTION OF THE INVENTION

Modified epoxy resin

The modified epoxy resin of formula (I) of the present invention can be prepared as follows:

The epoxy resins are dissolved in solvents such as ethyl ether and tetrahydrofuran (THF). To this mixture, allyl magnesium halide (in the following reaction scheme it will be represented as allyl magnesium bromide) is added under a nitrogen atmosphere while maintaining a suitable temperature of 0° C. to −70° C. By products remaining in the reaction products, for example, solvents and salts, are removed by washing with distilled water. The ratio of the allyl groups to the epoxy groups is between 1:5 and 1:50. The allyl-modified epoxy resin of the present invention may be prepared according to the following reaction.

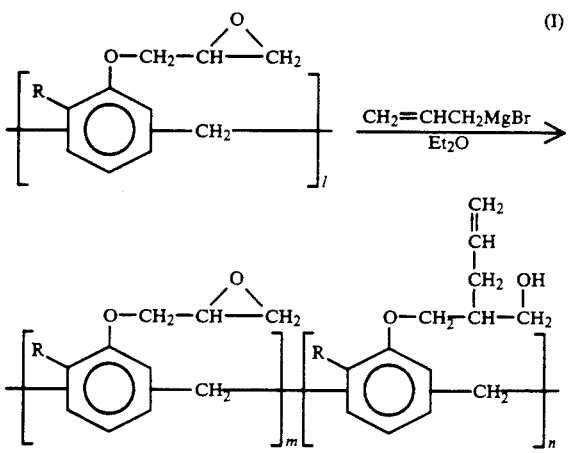

wherein,

R represents H or $C_1$-$C_{10}$-alkyl group, and l, m and n represent independently an integer of 0 to 100.

Epoxy resins to be used in the synthesis of said modified epoxy resin include bisphenol A type diglycidyl ether, phenol-novolak type epoxy resin and cresol-novolak type epoxy resin. In the present invention, cresol-novolak type epoxy resins, for example, EOCN 1020, 1025, 1027, 1029, 103S and 104S available from Japan Chemical Co., Ltd. are preferably used.

The resulting modified epoxy resin of the present invention can improve the heat resistance of resin compositions by adding it to conventional heat resistant epoxy resin compositions in a suitable amount or adding it to resin compositions for sealing semiconductor elements as a heat resistance enhancer in a specific amount.

Heat resistant resin composition

The present invention provides an improved heat resistance resin composition, which is prepared by mixing an epoxy resin, a maleimide resin, a curing agent and a curing promoter with an allyl-modified epoxy resin of formula (I) in an amount of from 10 to 50% by weight, based on the total weight of the composition, heating the mixture at a suitable temperature of from 120° C. to 200° C. to cure the mixture, and post-curing it at 200° C. for several hours.

If the amount of the allyl-modified epoxy resin to be added is less than 10% by weight, the heat resistant property and bonding force are very poor, and if the amount is greater than 50% by weight, problems related to the moisture resistant property and cost occur.

It is preferable to use a phenol-novolak resin as a curing agent in the present invention.

It is preferable to use tertiary amines, tertiary amine salts, quarternary ammonium salts, imidazole derivatives and organic phosphine compounds as a curing catalyst, since they shorten the curing time and improve the moldability. A suitable mixing ratio is from 0.1 to 3% by weight, based on the total weight of the composition.

Epoxy resins include cresol-novolak epoxy resin, and maleimide compounds include MB3000, MB3000H, MP2000X, MB7000, MP256 and 276 (Mitsubishi Petrochemical Co., Ltd.) and Bestlex A-4L (Sumitomo Chemical Co., Ltd.), etc.

In preparing a heat resistant resin composition, the use of modified epoxy resin excludes the incorporation of an allyl group into a phenol curing agent, followed by the reaction with epoxy resin, which is a conventional processing step used in the reaction of an epoxy resin and a maleimide being added to improve the thermal property of the epoxy resin. The use of the resin also provides homogeneous curing effects resulting from the improved bonding force and compatibility between the epoxy resin and maleimide resin by virtue of the addition of allyl-modified epoxy resin. Accordingly, it is possible to use the maleimide resin which is cheap and has poor compatibility with epoxy resin.

Epoxy resin composition for sealing semiconductor elements

The present invention also provides an epoxy resin composition having excellent heat resistance and moldability resulting from the increase of compatibility for sealing semiconductor elements, which includes epoxy resins, curing agents, curing promoters, stress lowering agents, and the allyl-modified epoxy resins of the general formula (I) as a heat resistance enhancer.

The preferable constitutional ratio of the resin composition is as follows:

| | |
|---|---|
| Epoxy resins | 0.1–15 wt % |
| Allyl-modified epoxy resins | 0.1–30 wt % |
| Curing agents | 4–10.0 wt % |
| Curing catalysts | 0.1–2.0 wt % |
| Coupling agents | 0.1–2.0 wt % |
| Colorants | 0.1–0.5 wt % |
| Fillers | 65–85.0 wt % |
| Mold release agents | 0.1–1.0 wt % |
| Flame retardants | 0.5–3.0 wt % |
| Stress lowering agents | 1.0–10.0 wt % |
| Bismaleimides | 0.1–30.0 wt % |

Epoxy resins used in the present invention include o-cresol-novolak resins, especially high purity epoxy resins having 190 to 220 epoxy equivalent weights and not more than 10 ppm of impurity contents. As a curing agent, phenol-novolak resin is used, which has 80° C. to 100° C. of agent, 100 to 120 hydroxyl equivalent weights and not more than 100 ppm of impurity contents.

Allyl-modified epoxy resins specifically used in the present invention belong to novolak-type epoxy resins having allyl groups as represented in the general formula (I).

It is preferable to use allyl-modified epoxy resins in an amount of from 0.1 to 30% by weight, preferably from 1 to 10% by weight, based on the total weight of the resin composition. If the amount is less than 0.1% by weight, heat resistant and moisture resistant properties are very poor, and if the amount exceeds 30% by weight, resin bleed and mold fouling occur and moldability decreases, and thus, serious problems related to gel time and conditions at post-curing occur.

As fillers, it is preferable to use high purity fused silica having a particle size from 10 μm to 30 μm.

Curing catalysts or promoters include amines, imidazole derivatives and organic phosphine compounds. Preferable organic phosphine compounds include triphenylphosphine, and preferable imidazole derivatives include 2-methyl imidazole, 2-methyl-4-ethylimidazole, 2-heptadecyl imidazole and the like.

Maleimide compounds include MB3000, MB3000H, MP2000H, MB7000, MP256 and 276 available from Mitsubishi Petrochemical Co., Ltd. It is preferable to use bismaleimide type MB3000 in the Examples of the present invention.

Coupling agents, which are used to surface treat inorganic fillers, include silane-based coupling agents. It is preferable to use γ-glycydoxypropyl trimethoxysilane as the coupling agent.

Stress lowering agents include silicone rubber and epoxy-modified silicone oil. According to the high integration of semiconductors, in order to increase the compatibility, epoxy-modified silicone oil is used as a stress lowering agent in the present invention.

As mold release agents, carnauba wax or Montan wax is used in an amount of from 0.1 to 1.0% by weight. As colorants, 0.1 to 0.5% by weight of carbon black is used. Brominated epoxy resin and $Sb_2O_3$ are used as flame retardants.

An epoxy resin composition for sealing semiconductor elements of the present invention is prepared by surface treating inorganic fillers with coupling agents, homogeneously mixing the mixture with the remaining components in a Henschel mixer or a Rodige mixer, melt blending it with a kneader or roll mill at 90° C. to 110° C. for from about 5 min. to 15 min., cooling and pulverizing to give a powder.

When sealing the semiconductor elements with the powdery resin composition, the resin composition is tableted in a tableting machine in the form of powder. The resultant tablet-type resin composition is preheated with a high frequency preheater, and molded with a transfer molding press at from 170° C. to 180° C. for 90 sec. to 120 sec to seal semiconductor elements.

Due to the use of an allyl-modified epoxy resin as a heat resistance enhancer, the resin composition prepared by the present invention has excellent heat resistance, as compared with prior resin compositions. Thus, it prevents package crack at reflow soldering, improves moldability problems such as mold releasing properties and mold fouling which occurred by the use of aromatic imide compounds in the prior art.

Hereinafter, the present invention will be described in detail by the Examples, which should not be construed to limit the scope of the present invention.

EXAMPLES

Synthesis of the allyl-modified epoxy resin 202 g of o-cresol-novolak epoxy resin (EOCN 1020; commercially available from Nippon Kayakr K.K.) is dissolved into 950 ml of diethyl ether. 50 ml to 300 ml of allyl magnesium bromide (1.0M in ether, available from Aldrich) is added to the mixture for 2 hours with stirring at −70° C. under a nitrogen atmosphere, and the mixture is allowed to react for 4 hours, while maintaining the temperature. Distilled water is added to the resultant product to separate inorganic salts and solvent, whereby an allyl-modified epoxy resin is obtained.

Heat resistant resin compositions

EXAMPLES 1-8

20.0 phr of allyl-modified epoxy resin obtained from the above synthesis, 70.0 phr of o-cresol-novolak epoxy resin (EOCN 1020), 30.0 phr of maleimide (MB3000MP2000X), 40.0 phr of phenol-novolak resin (PSM-4261) and 1.5 phr of triphenylphosphine are mixed, and the mixture is allowed to cure at 120° C. for 3 hours and at 200° C. for 4 hours, whereby a heat resistant resin composition is obtained.

The physical properties of the resultant compositions are shown in Table 1.

COMPARATIVE EXAMPLES 1-2

The Comparative Examples are carried out in the same manner as in Examples 1 to 8, except that the allyl-modified epoxy resin is replaced with diaminodiphenyl-methane (DDM).

The physical properties of the resultant composition are measured by the followings. The results are also shown in Table 1.

1) HDT(°C.): measured by ASTM D-648
2) TGA(°C.): Stanton Redcraft STA 1500(measured at 5° C./min.)
3) Tg: Stanton Redcraft TMA 1000(measured at 10° C./min.)

TABLE 1

| | | Example | | | | | | | | Comparative Example | |
|---|---|---|---|---|---|---|---|---|---|---|---|
| | | 1 | 2 | 3 | 4 | 5 | 6 | 7 | 8 | 1 | 2 |
| Epoxy resin (EOCN 1020) | | 70 | 70 | 70 | 70 | 70 | 70 | 70 | 70 | 70 | |
| Maleimide | MB3000 | 30 | 30 | 30 | 30 | 30 | 30 | — | — | 30 | — |
| | MP2000X | — | — | — | — | — | — | 30 | 30 | — | 30 |
| Allyl-modified epoxy resin (ratio of allyl to epoxy groups) | 5 | 20 | — | — | — | — | — | — | — | — | — |
| | 10 | — | 20 | — | — | — | — | — | — | — | — |
| | 15 | — | — | 20 | — | — | — | — | — | — | — |
| | 20 | — | — | — | 20 | — | — | 20 | — | — | — |
| | 25 | — | — | — | — | 20 | — | — | — | — | — |
| | 30 | — | — | — | — | — | 20 | — | 20 | — | — |

TABLE 1-continued

|  |  | Example | | | | | | | | Comparative Example | |
|---|---|---|---|---|---|---|---|---|---|---|---|
|  |  | 1 | 2 | 3 | 4 | 5 | 6 | 7 | 8 | 1 | 2 |
| DDM |  | — | — | — | — | — | — | — | — | 20.4 | 24.8 |
| HDT (°C.) |  | 201 | 210 | 218 | 220 | 236 | 240 | 239 | 245 | 196 | 187 |
| TGA (°C.) | 5 wt % loss | 320 | 320 | 339 | 348 | 351 | 365 | 360 | 363 | 348 | 343 |
| 5° C./min | 10 wt % loss | 330 | 332 | 346 | 355 | 360 | 369 | 371 | 373 | 369 | 360 |
| Tg (°C.) 10° C./min |  | 15 | 177 | 201 | 204 | 205 | 210 | 217 | 220 | 210 | 202 |

Epoxy resin composition for sealing semiconductor elements

EXAMPLES 9-11

The constituents set forth in Table 2 are mixed in a Henschel mixer to obtain a powdery precomposition. The resultant product is kneaded with a kneader at 100° C. for 10 min., cooled, and pulverized to give an epoxy resin composition.

The physical properties of the epoxy resin compositions for sealing semiconductor elements are measured by the followings. The results are disclosed in Table 3.

1) Sprial flow: Measured at 175° C. of molding temperature and 70 kg.f/cm² of molding pressure using a mold prepared according to EMMI standard.
2) Tg: Measured with TMA equipment.
3) E (kg.f/mm²): Measured with UTM according to ASTM D190.
4) Thermal expansion coefficient α(°C.$^{-1}$): Measured according to ASTM D696
5) Flexural strength F(kg.f/mm²): Measured with UTM according to ASTM D790.
6) Heat resistant soldering test by VPS: Maintained for 1 min. in 215° C. vapor soldering bath, and observed the crack.
7) Degree of mold fouling: Maximum molding number, when using a molding cleaner.

COMPARATIVE EXAMPLES 3-4

Comparative Examples 3-4 are carried out in the same manner as in Examples 9-11 using the constituents set forth in Table 2. The results of the measured physical properties are presented in Table 3.

TABLE 2

| Constituents | Example | | | Comparative Example | | (Unit:wt %) |
|---|---|---|---|---|---|---|
|  | 9 | 10 | 11 | 3 | 4 |  |
| Epoxy resin (o-cresol-novolak) | 14.57 | 13.07 | 8.07 | 14.57 | 13.07 |  |
| Phenol-novolak | 5.83 | 5.83 | 5.83 | 5.83 | 5.83 |  |
| Triphenylphosphine | 0.38 | 0.38 | 0.38 | 0.38 | 0.38 |  |
| Fused silica | 73.8 | 73.8 | 73.8 | 73.8 | 73.8 |  |
| Epoxy-modified silicone oi | 1.15 | 1.15 | 1.15 | 1.15 | 1.15 |  |
| Brominated epoxy resin | 1.3 | 1.3 | 1.3 | 1.3 | 1.3 |  |
| KBM 403 (Shin-etsu Chemical Co., Ltd.) | 1.11 | 1.11 | 1.11 | 1.11 | 1.11 |  |
| Carnauba wax | 0.23 | 0.23 | 0.23 | 0.23 | 0.23 |  |
| Sb$_2$O$_3$ | 0.85 | 0.85 | 0.85 | 0.85 | 0.85 |  |
| Carbon black | 0.26 | 0.26 | 0.26 | 0.26 | 0.26 |  |
| Allyl-modified epoxy resin | 0.5 | 2 | 7 | — | — |  |
| Maleimide (MB-3000H, Mitsubishi Petrochem.) | 10 | 10 | 10 | — | 2 |  |
| Kerimide 3561 (Nippon (Polyimide Co., Ltd.) | — | — | — | 0.5 | — |  |

TABLE 3

|  | Example | | | Comparative Example | |
|---|---|---|---|---|---|
|  | 9 | 10 | 11 | 3 | 4 |
| Spiral flow (in.) | 45 | 42 | 41 | 40 | 38 |
| Tg (°C.) | 190 | 192 | 195 | 186 | 188 |
| E (kg · f/mm²) | 1200 | 1290 | 1295 | 1200 | 1290 |
| α (×10$^{-5}$/°C.) | 1.8 | 1.7 | 1.6 | 1.8 | 1.8 |
| F (kg · f/mm²) | 13.0 | 13.0 | 14.0 | 13.0 | 13.0 |
| VPS heat resistance test *1 | 2/600 | 0/600 | 0/600 | 10/600 | 10/600 |
| Degree of mold fouling *2 | 500 | 600 | 600 | 100 | 50 |

*1 In the values for VPS heat resistance test, the denominator denotes the number of sample, and the numerator denotes failure number.
*2 Maximum moldability number without mold cleaner.

The data in Table 3 demonstrates that resin composition according to the present invention has excellent moldability and heat resistance, as compared to that of the comparative examples in which the allyl-modified epoxy resin is not contained, and thus, it has improved impact strength resistance of VPS conditions and the degree of mold fouling and is useful for sealing semiconductor elements.

What is claimed is:

1. Epoxy resin compositions for sealing semiconductor elements comprising an allyl-modified epoxy resin of formula (I) as a heat resistance enhancer

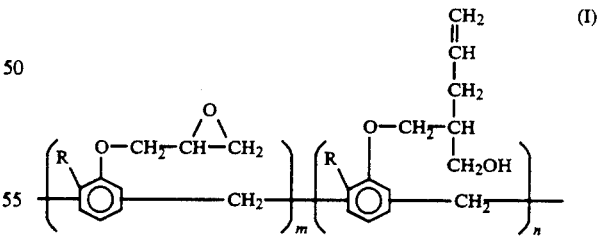

wherein R represents H or C1-C10 alkyl and m represents an integer of 0 to 100 and n represents an integer of 1 to 100; and an epoxy resin other than said allyl-modified epoxy resin of formula (I).

2. An epoxy resin composition as claimed in claim 1, wherein the allyl-modified epoxy resin is present in an amount of from 0.1 to 30% by weight, based on the total weight of the composition.

3. An epoxy resin composition as claimed in claim 1 wherein said allyl-modified epoxy resin has a ratio of allyl groups to epoxy groups of about 1:5 to about 1:50.

4. An epoxy resin composition according to claim 1 wherein said composition further includes a curing agent and a curing promoter.

5. An epoxy resin composition according to claim 4 wherein said composition further includes a stress lowering agent.

6. An epoxy resin composition as claimed in claim 4 wherein said composition includes a cresol novolak resin.

7. An epoxy resin composition as claimed in claim 4 wherein said composition includes a maleimide resin.

8. An epoxy resin composition as claimed in claim 6 wherein said cresol novolak resin comprises an o-cresol novolak resin.

9. An epoxy resin composition as claimed in claim 4 wherein said curing agent is a phenol novolak curing agent.

10. An epoxy resin composition as claimed in claim 4 wherein said curing promoter is an organic phosphine curing promoter.

11. An epoxy resin composition as claimed in claim 10 wherein said curing promoter is triphenyl phosphine.

12. An epoxy resin composition as claimed in claim 5 wherein said stress lowering agent comprises an epoxy-modified silicone oil.

13. An epoxy resin composition as claimed in claim 1 further including an inorganic filler.

14. An epoxy resin composition as claimed in claim 13 wherein said inorganic filler comprises fused silica.

15. An epoxy resin composition as claimed in claim 13 further including a coupling agent.

* * * * *